United States Patent [19]
Bobeck

[11] 3,713,117
[45] Jan. 23, 1973

[54] MAGNETORESISTANCE DETECTOR FOR SINGLE WALL DOMAINS

[75] Inventor: Andrew Henry Bobeck, Chatham, N.J.

[73] Assignee: Bell Telephone Laboratories, Incorporated, Murray Hill, N.J.

[22] Filed: March 1, 1972

[21] Appl. No.: 230,755

[52] U.S. Cl. ..340/174 EB, 340/174 TF, 340/174 SR
[51] Int. Cl. ..........................G11c 11/14, G11c 19/00
[58] Field of Search......340/174 TF, 174 EB, 174 SR

[56] References Cited

UNITED STATES PATENTS 3,680,066 7/1972 Copeland .......................340/174 EB

OTHER PUBLICATIONS

IBM Tech. Disclosure Bulletin "Biaxial Magneto–Resistive Sensing of Cylindrical Magnetic Domains" by Almasi et al., Vol. 14, No. 1, 6/71, p. 196, 197.
IBM Tech. Disclosure Bulletin "Magnetoresistive Bubble Domain Random–Access Memory Cell" by Walker; p. 2139; Vol. 14, No. 7, 12/71.

*Primary Examiner*—Stanley M. Urynowicz, Jr.
*Attorney*—R. J. Guenther et al.

[57] ABSTRACT

A number of geometries are disclosed for magnetoresistance elements compatible with fine-grained, field-access, single wall domain arrangements that render the elements insensitive to the rotating in-plane magnetic field which moves domains in such arrangements.

10 Claims, 7 Drawing Figures

MAGNETORESISTANCE DETECTOR FOR SINGLE WALL DOMAINS

FIELD OF THE INVENTION

This invention relates to magnetoresistance detectors for single wall magnetic domains.

BACKGROUND OF THE INVENTION

A. H. Bobeck U.S. Pat. No. 3,534,347 issued Oct. 13, 1970, describes the movement of single wall domains in a layer of material along channels defined by a pattern of magnetically soft elements. The layer of material typically is characterized by a uniaxial anisotropy normal to the plane of the layer, and domains are visualized as right circular cylinders with flux directed (positively) upward out of the plane of the layer. Domain movement is effected by the provision of a magnetic field reorienting in the plane of the layer and causing changing pole patterns in the magnetically soft elements. The resulting pole patterns, in turn, produce a changing pattern of field gradients which causes domain movement. Arrangements of this type are referred to as operative in the "field-access" mode.

Magnetoresistance detectors for field-access arrangements in operative circuits are designed as part of bridge arrangements to eliminate the response of the detector to the reorienting in-plane field. Typically, the in-plane field produces a response in the detector double the in-plane field frequency and ten times the signal due to a domain. A reduction of the in-plane field contribution with respect to that of the domain, of course, is advantageous. One suitable magnetoresistance detector for magnetic domains is described in W. Strauss U.S. Pat. No. 3,609,720, issued Sept. 28, 1971 and a bridge arrangement employed for reducing the effects of the in-plane field on such a detector is described in copending application Ser. No. 133,206 of A. H. Bobeck and H. E. D. Scovil, filed Apr. 12, 1971. Copending application Ser. No. 160,841 of A. H. Bobeck and H. E. D. Scovil filed July 8, 1971, moreover, describes a "fine-grained," magnetically soft pattern for defining propagation channels for domains and copending application Ser. No. 201,755 filed Nov. 24, 1971, for A. H. Bobeck, F. J. Ciak, and W. Strauss discloses a magnetoresistance detector for a fine-grained, field-access arrangement where domains are expanded in a detector stage coupled by the detector.

In a typical fine-grained, field-access arrangement, each stage is defined illustratively by a chevron pattern where consecutive stages in the detector area include first an increasingly greater, then an increasingly smaller, number of V-shaped (or chevron) elements to either side of the detector stage along the information path. The detector stage is formed by a magnetically soft strip interconnecting the apices of the elements in the detector stage and forming the magnetoresistance element.

BRIEF DESCRIPTION OF THE INVENTION

The present invention is directed at a magneto-resistance detector for a fine-grained, field-access arrangement which is only negligibly responsive to the reorienting magnetic drive (in-plane) field even in the absence of a bridge arrangement.

In accordance with one embodiment of the present invention, the apices of the V-shaped elements in the chevron pattern in the detector stage are disposed about a circular path which closes through the elements of a remote stage. The magnetoresistance element, accordingly, assumes the geometry of a circle or ring to which leads are attached and to which a DC pulse is applied. A signal appearing across the leads in response to a domain in the detector stage is detected with only negligible contribution due to the rotating in-plane field.

In another embodiment, the apices of the elements of the detector stage follow only 180° of a circle. In this instance, a convenient arrangement results for forming a closed loop information channel for recirculating domains past the detector stage.

DETAILED DESCRIPTION

Figure 1:
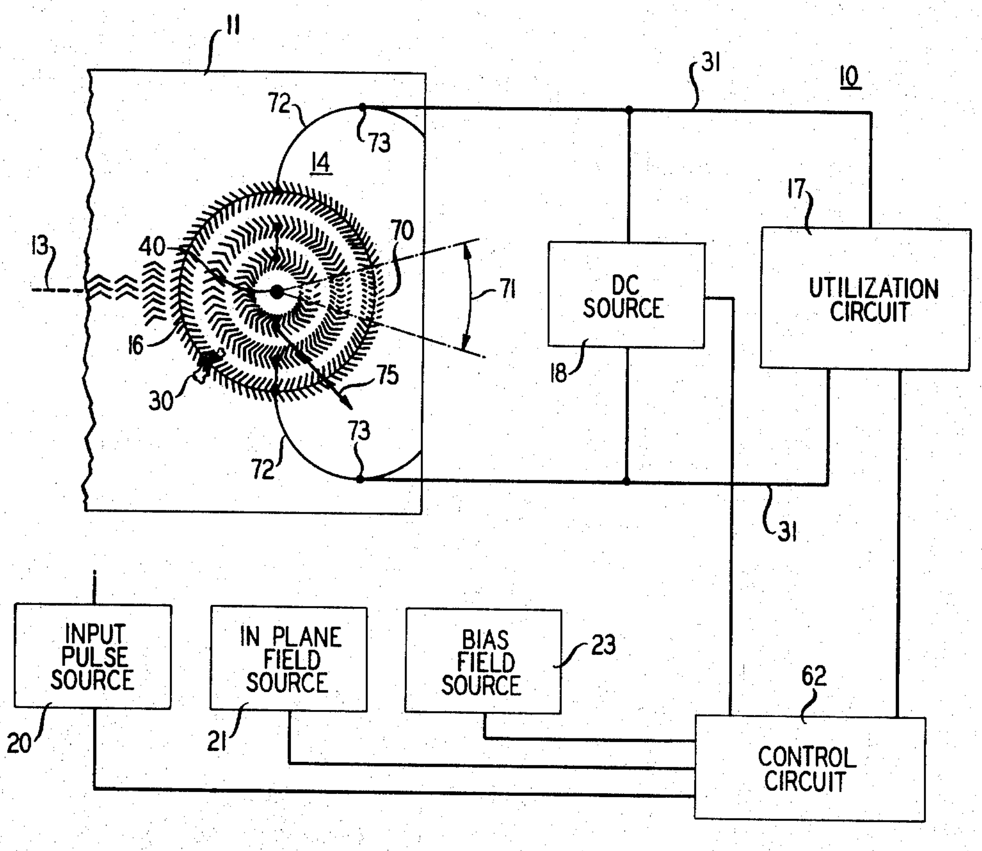
FIG. 1 is a schematic representation of a single wall domain arrangement including a magnetoresistance detector in accordance with this invention.

FIG. 1 shows an illustrative single wall domain arrangement 10 in accordance with this invention. The arrangement comprises a layer 11 of material in which single wall domains can be moved. A channel 13 for the movement of domains is defined in layer 11 illustratively by a fine-grained chevron pattern of magnetically soft elements which terminates to the right as viewed in FIG. 1 at detector 14.

Detector 14 comprises a number of V-shaped (or chevron) elements formed in a ring and having the apices therefore interconnected by a magnetically soft strip 16 which forms a circle. Strip 16 is of electrically conducting, magnetically soft material such as Permalloy and is connected electrically to a utilization circuit 17 and to a DC source 18.

Domains are introduced selectively at an input position (not shown) in channel 13 responsive to signals from an input pulse source, represented by block 20 in FIG. 1 and are moved along channel 13 to detector 14 in response to a magnetic field reorienting (viz: rotating) in the plane of layer 11. The in-plane field is supplied by a source represented by block 21 in FIG. 1.

Domains in layer 11 are maintained at a nominal operating value by a bias field supplied by a familiar source represented by block 23 of FIG. 1. With a fine-grained pattern such as a chevron pattern where adjacent elements in a given stage of channel 13 are typically spaced apart less than about the width of a domain, a domain is under the influence of a line of magnetic poles which causes the domain to extend laterally with respect to the axis of channel 13.

Figure 2:
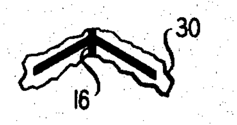
FIG. 2 is a schematic representation of a portion of the arrangement of FIG. 1.

This lateral expansion of the domain is more and more pronounced, the greater the number of elements in a given stage. Consider a detector stage of domain propagation channels in which many such elements extend not only laterally but also into a circular geometry as shown in FIG. 1. Consider specifically an illustrative number of chevrons, assumed arbitrarily to be 36 to be included in such a circle. FIG. 2 shows a representative element in area 30 of FIG. 1 and FIG. 3 shows a graph of the voltage across conductors 31 of FIG. 1 due to that element.

Figure 3:
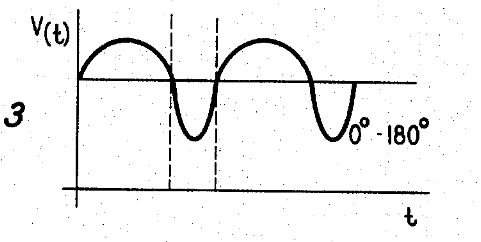
FIGS. 3 and 4 are graphs showing the voltage contributions to the output signal provided by the detector of FIG. 1 due to the representative portion thereof shown in FIG. 2.
Figure 4:
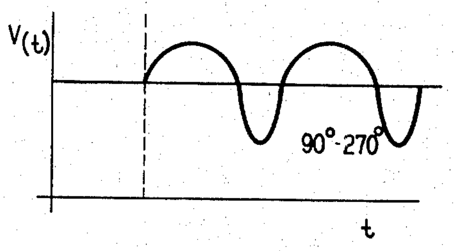

FIG. 3 specifically is an assumed plot of voltage versus time due to the contribution of a representative portion of magnetoresistance element 16 in response to the in-plane field supplied by source 21. If we assume an even distribution of 36 such elements about the circle defined by 16, the tenth element from the representative element characterized in FIG. 2 exhibits a like plot 90° out of phase with that of FIG. 3. The plot for the tenth element is shown in FIG. 4. Similarly, each such element contributes a like voltage form and the sum of those voltages is a constant which adds to the voltage contribution from the DC source 18. It may be appreciated that the assumed waveform shown in FIGS. 3 and 4 is arbitrary. As long as like elements produce like voltage forms over a cycle of the in-plane field, statistically their resultant is a constant, regardless of the waveform of each.

Thus, it is clear that a circular geometry for the magnetoresistance element (16) of FIG. 1 is, for all practical purposes, insensitive to the rotating in-plane field which drives domains along channel 13.

With a circular geometry for the magnetoresistance element as shown in FIG. 1, domains, once detected, are eliminated. A convenient technique for eliminating domains includes an annihilator comprising a familiar disk of magnetically soft material (designated 40 in FIG. 1) about the periphery of which a domain moves constantly as the in-plane field reorients. A domain, once detected by element 16 in FIG. 1, shrinks to its nominal size as the in-plane field rotations cause the domain to move into the sequence of stages subsequent to the detector stage in which the number of chevron elements consecutively reduces. A minimum number of elements occurs in the stage next preceding the annihilator 40.

On the other hand, the magnetoresistance element need not form a complete circle. A comparison of FIGS. 3 and 4 indicates that the nineteenth element (of the type shown in FIG. 2) (180°) provides a contribution in phase with that of the representative element. Consequently, the advantages in accordance with this invention can be realized with a magnetoresistance element which forms a semicircle rather than a circle.

Figure 5:
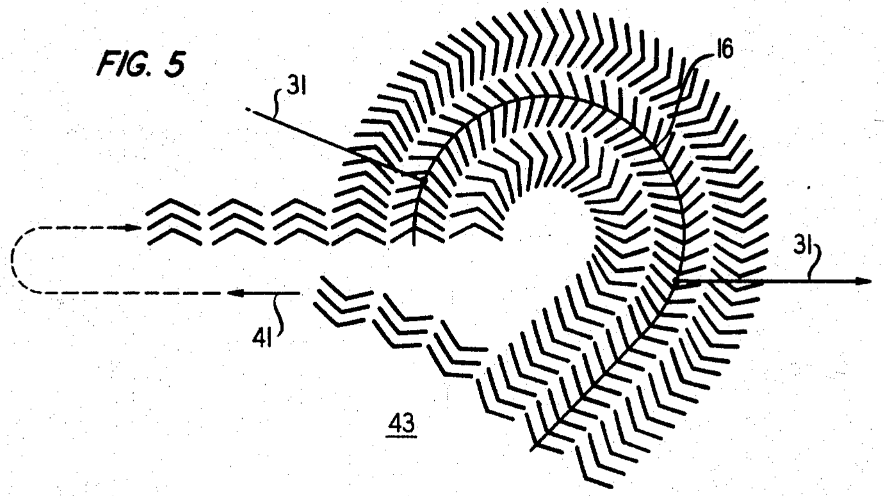
FIGS. 5, 6, and 7 are schematic representations of alternative arrangements in accordance with this invention.

A semicircular magnetoresistance element is shown in FIG. 5 and is operative entirely as described above. A semicircular design can be seen to lend itself readily to closed-loop operation where data can be recirculated, for example, clockwise as indicated by arrow 41 of FIG. 5. A domain entering the detector stage expands laterally along poles generated in the chevron, the elements of which are interconnected by the magnetoresistance element 16 of FIG. 5. In response to subsequent cycles of the in-plane field the detected domain shrinks to a size dictated by both the number of elements in area 43 of FIG. 5 and the operating bias field as is clear from the above-mentioned copending application of A. H. Bobeck and H. E. D. Scovil.

Figure 6:
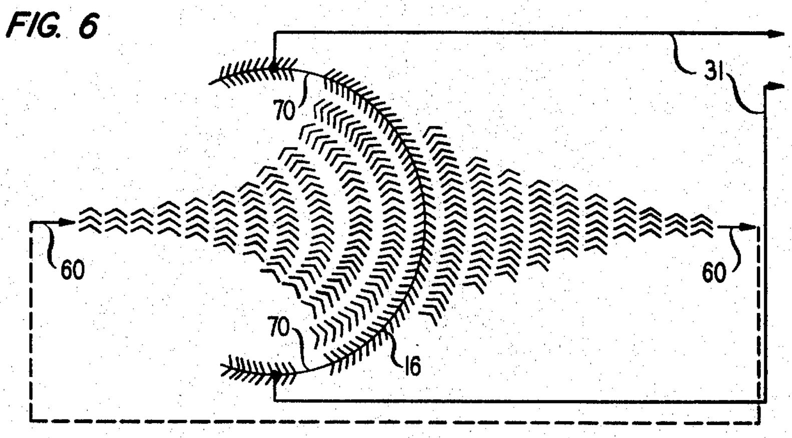

FIG. 6 shows an alternative closed-loop domain propagation channel design also including a semicircular detector stage. The geometry of this particular embodiment more closely resembles an arrangement where the number of elements of the chevron pattern first increases then decreases with a maximum at the detector stage as shown in the above-mentioned copending application of A. H. Bobeck, F. J. Ciak, and W. Strauss except for the curvature of the detector stage and for a compensating curvature of adjacent stages of the channel to either side of the detector stage. The direction of data flow is clockwise as indicated in FIG. 6 by the broken arrow 60.

Figure 7:
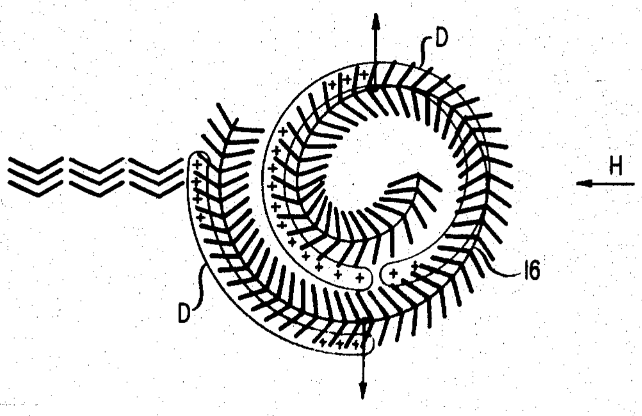

Although a circular geometry for the chevron pattern of the detector stage is most easily understood, a helical geometry instead of the circular geometry perhaps provides a more practical domain structure as is clear from a consideration of the poles generated in the various elements of the detector stage. It is clear, for example, that elements, disposed along a curved path, have orientations different from one another. For any given in-plane field orientation, attracting poles are generated in different positions in different elements. FIG. 7 shows a helical arrangement of such elements for an assumed in-plane orientation and identifies the position of corresponding attracting poles in each element by a plus (+) sign for an assumed in-plane field orientation.

The plus signs are shown for an in-plane field directed to the left (see FIG. 7 arrow H) generating strong attracting poles at the leftmost end of that portion of each element which is aligned with the field. The helical geometry ensures that domains moved into the detector do not wind on themselves to become spirals but remain arcuate strips (viz: a horseshoe) as shown by domains D in FIG. 7. A wedge-shaped section of the chevron pattern may be omitted from the circular pattern of FIG. 1 to this same end as indicated by lines 71 there.

Although the chevron elements in a detector stage in accordance with this invention are disposed along a curved path, it is not necessary that a domain occupy that entire path. The curved path is to eliminate the effect of the in-plane field on the magnetoresistance element, an effect otherwise present whether a domain is present or not. A domain detected by the magnetoresistance element, on the other hand, need only be expanded to a size compatible with the number of elements in adjacent stages. The expansion of such a domain is limited to the confines of the channel by, for example, the removal of a chevron element or two in areas designated 70 in FIGS. 1, 5, and 6.

Data in a single wall domain propagation channel is represented by the presence and absence of a domain at the detector during each cycle of the in-plane field. The presence of a domain modifies the resistance of the magnetoresistance element 16 and thus the voltage across conductors 31 (FIG. 1) in an operation now well understood in the art. The various sources and circuits of FIG. 1 operative to this end are activated and controlled by a control circuit represented by block 62 of FIG. 1.

Magnetoresistance detectors having circular and semicircular geometries of the type described have been operated. In one example, a chevron pattern of magnetically soft Permalloy defined a closed-loop domain propagation channel for nominally 6-micron domains in an epitaxially formed layer of YGd iron garnet on a substrate of GdGa garnet in the presence of an 80-oersted bias field and in response to a 30-oersted in-plane field rotating at 100 kilocycles. A DC current of 5 milliamperes was maintained across the magnetoresistance element. Adjacent elements of a chevron of each stage were on a 5-micron center and each stage was 20 microns wide. A semicircular geometry of 50 elements defined the detector stage, the apices of those elements being interconnected by the magnetoresistance element in the manner of FIG. 6. An output of 0.2 millivolt was exhibited in response to the presence of a domain. The output was superposed on an essentially constant value of 300 millivolts due to the DC current. This generator design caused the in-plane field to generate an output only one-fifth of the signal level, a significant improvement over conventional magnetoresistance detectors.

Portions 72 of conductors 31 of FIG. 1 are shown to follow a semicircular path including tabs 73 to which external connection can be made. If a semicircular path is followed and extended beyond the tabs, portions 72 can be made of (electrically conducting) Permalloy without introducing contributions due to the in-plane field into the detector. In this instance, portions 72 and the tabs can be formed simultaneously with the fine-grained channel defining pattern thus permitting a significant simplification in the fabrication of the device.

Relatively large output signals are achieved by connecting electrically in series the portions of the magnetoresistance elements defined by consecutive turns of the circular multiple turn detector of, for example, the structure of FIG. 1 as shown in phanthom there resulting in a continuous output taken at an insulated output conductor indicated by arrow 75 in FIG. 1.

What has been described is considered merely illustrative of the principles of this invention. Therefore, various modifications can be devised by those skilled in the art in accordance with those principles within the spirit and scope of this invention.

What is claimed is:

1. A magnetic arrangement comprising a layer of magnetic material in which single wall domains can be moved, a pattern of elements for defining in said layer a multistage domain propagation channel including a detector stage, said pattern in said detector stage including a greater number of elements than others of said stages, said elements in said detector stage being of a geometry to permit the expansion of a domain there laterally with respect to the axis of domain movement in said channel, said elements in said detector stage forming a first curved path such that magnetic poles are generated in different positions therein in the presence of a magnetic field reorienting in the plane of said layer, said elements of said detector stage being interconnected by a magnetoresistance element, and electrical means connected to said magnetoresistance element for providing a signal indicative of the presence of a domain in said layer at said detector stage.

2. A magnetic arrangement in accordance with claim 1 wherein said pattern of elements comprises repetitive fine-grained patterns defining consecutive stages of said channel and said first curved path is a circle.

3. A magnetic arrangement in accordance with claim 1 wherein said pattern of elements comprises a repetitive fine-grained pattern defining consecutive stages of said channel and said first curved path is a semicircle.

4. A magnetic arrangement in accordance with claim 1 wherein said pattern of elements comprises a repetitive fine-grained pattern defining consecutive stages of said channel and said first curved path is a helix.

5. A magnetic arrangement in accordance with claim 2 wherein said fine-grained pattern comprises V-shaped elements, said stages next preceding and subsequent to said detector stage including an increasing and a decreasing number of elements respectively, said channel terminating at a domain annihilator within the area encompassed by said circle.

6. A magnetic arrangement in accordance with claim 3 wherein said fine-grained pattern comprises V-shaped elements increasing and decreasing numbers of which define stages preceding and following said detector stage, and said channel is defined as a closed loop for recirculating domain patterns therein.

7. An arrangement in accordance with claim 5 wherein said elements are eliminated from a portion of said circle in said subsequent stages.

8. An arrangement comprising a layer of material in which single wall domains can be moved, means for defining a channel in said layer for domain movement along an axis, a fine-grained pattern of elements forming a curved path disposed laterally with respect to said axis, said elements being interconnected by a magnetoresistance element, and electrical connections to said magnetoresistance element.

9. An arrangement in accordance with claim 8 wherein said means for defining comprises a pattern of elements so disposed and of a geometry for generating changing pole patterns in response to a magnetic field reorienting in the plane of said layer.

10. An arrangement in accordance with claim 9 wherein said elements are arranged in repetitive fashion for defining a multiple stage channel including a plurality of said elements in each stage, said elements in each stage being spaced apart distances less than about the diameter of one of said domains.

* * * * *